United States Patent [19]

Tanaka et al.

[11] Patent Number: 5,244,447
[45] Date of Patent: Sep. 14, 1993

[54] TOOL MANAGEMENT METHOD

[75] Inventors: Kunio Tanaka, Akishima; Yoshiro Matsui, Minamitsuru, both of Japan

[73] Assignee: Fanuc Ltd, Minamitsuru, Japan

[21] Appl. No.: 809,547

[22] PCT Filed: May 23, 1991

[86] PCT No.: PCT/JP91/00695

§ 371 Date: Jan. 30, 1992

§ 102(e) Date: Jan. 30, 1992

[87] PCT Pub. No.: WO91/18708

PCT Pub. Date: Dec. 12, 1991

[30] Foreign Application Priority Data

Jun. 5, 1990 [JP]  Japan .................................. 2-147041

[51] Int. Cl.$^5$ ...................... B23Q 3/155; G06F 15/46
[52] U.S. Cl. .................................. 483/1; 364/474.11;
364/474.21; 483/4; 483/11
[58] Field of Search ...................... 483/10, 11, 7, 1, 4,
483/5, 8, 15; 364/474.11, 474.22, 474.17, 474.21

[56] References Cited

U.S. PATENT DOCUMENTS

| | | | |
|---|---|---|---|
| 4,281,379 | 7/1981 | Austin | 364/474.22 X |
| 4,396,976 | 8/1983 | Hyatt | 364/474.22 |
| 4,435,771 | 3/1984 | Nozawa et al. | 364/474.11 |
| 4,472,783 | 9/1984 | Johnstone | 364/474.11 X |
| 4,628,434 | 12/1986 | Tashiro et al. | 364/140 X |
| 4,901,218 | 2/1990 | Cornwell | 364/474.11 |

FOREIGN PATENT DOCUMENTS

| | | | |
|---|---|---|---|
| 3602457 | 3/1987 | Fed. Rep. of Germany | 364/474.11 |
| 35485 | 3/1979 | Japan | 483/10 |
| 263208 | 12/1985 | Japan | 364/474.11 |
| 1-46644 | 6/1989 | Japan | 364/474.17 |
| 36046 | 2/1990 | Japan | 483/11 |

OTHER PUBLICATIONS

Kurimoto, "Tool management system for advanced manufacturing," Manufacturing Technology International, No. 1, 1989, pp. 101-106, London, GB.
Hammer, et al., "In Stufen auszubauendes flexibles Fertigungssystem zum Bohren und Fräsen," V.D.I.-Zeitschrift, vol. 125, No. 5, Mar. 1983, pp. 135-141, Dusseldorf, DE.

*Primary Examiner*—William Briggs
*Attorney, Agent, or Firm*—Staas & Halsey

[57] ABSTRACT

A tool management method in a factory automation (FA) system uses an FA computer and machining cells. An FA computer such as a cell controller is connected with computer numerically-controlled units via bi-directional communication lines. When data on a tool service life or the like is changed on the cell controller (S1, S2), the changed data on the tool service life is sent to a computer numerically-controlled unit (S3) to update the data on the tool service life stored in the computer numerically-controlled unit (CNC) (S4). Similarly, when the computer numerically-controlled unit changes the number of times the tool has been used or the like, the changed data is sent to the cell controller in the same way. This enables the cell controller to be always informed of the most recent tool management data. And as the computer numerically-controlled units can immediately obtain tool management data that has been changed at the cell controller, a more efficient tool management is ensured.

4 Claims, 4 Drawing Sheets

| TOOL NO. | AREA NO. | DATA |
|---|---|---|
| 01 | 01 | TOOL WEIGHT |
|  | 02 | TOOL LENGTH CORRECTION AMOUNT |
|  | 03 | TOOL DIAMETER CORRECTION AMOUNT |
|  | 04 | WEAR OF TOOL LENGTH |
|  | 05 | WEAR OF TOOL DIAMETER |
|  | 06 | SET VALUE OF TOOL SERVICE LIFE |
|  | 07 | TOOL OPERATING TIME |
|  | 08 | NUMBER OF TIMES TOOL USED |
| 02 | 01 | TOOL WEIGHT |
| N | 01 | TOOL WEIGHT |
|  | 02 | TOOL LENGTH CORRECTION AMOUNT |
|  | 03 | TOOL DIAMETER CORRECTION AMOUNT |
|  | 04 | WEAR OF TOOL LENGHT |
|  | 05 | WEAR OF TOOL DIAMETER |
|  | 06 | SET VALUE OF TOOL SERVICE LIFE |
|  | 07 | TOOL OPERATING TIME |
|  | 08 | NUMBER OF TIMES TOOL USED |

FIG. 3

TOOL MANAGEMENT METHOD

BACKGROUND OF THE INVENTION

1. Field of the Invention

The present invention relates to a tool management method in a factory automation (FA) system, and more particularly, to a tool management method for a real-time exchange of tool management data between an FA computer and machining cells.

2. Description of the Related Art

A factory in which many computer numerically-controlled machine tools are installed comprises machining cells each centered around a computer numerically-controlled machine tool, a cell controller for controlling the machining cells, and a host computer connected to the cell controller.

Tool management data, which includes data on the service life and the like of tools used for individual computer numerically-controlled machine tools, is managed by individual computer numerically-controlled units. When the tool management data is managed by the host computer or the cell controller, the data is cyclically transferred in data blocks to the cell controller, because the communication line is low-speed and unidirectional, and thus the data is managed by the cell controller, which processes the data, or managed with the aid of an operator.

To obtain a more efficient tool management, however, preferably the cell controller or the computer numerically-controlled unit receives the most recent data on the service life, and number of uses and the like of tools, at all times, but with the conventional unidirectional, low-speed communication line, the tool management data cannot be transferred in a real-time mode, and therefore, an efficient tool management cannot be achieved.

SUMMARY OF THE INVENTION

The present invention is intended to solve the aforementioned problem, and an object of the present invention is to provide a tool management method which permits a real-time exchange of tool management data, to thereby achieve an efficient tool management.

To fulfill the above-mentioned object, a tool management method in an FA system, which consists of an FA computer and machining cells, is provided, wherein the FA computer is connected with the computer numerically-controlled units in the machining cells through bi-directional communication lines, so that these units share the tool management dat. Therefore, whenever the tool management data of either side is updated, the updated data is transferred to the other side, to thereby carry out a real-time management of tool management data.

An FA computer such as a cell controller is connected to computer numerically-controlled units with bi-directional communication lines. These units both maintain tool management data, and whenever the tool management data of either side is changed, the changed data is transferred to the other side, and thus the controlling computer can always obtain updated tool management data. Also, the computer numerically-controlled units can immediately obtain tool management data that has been changed by the FA computer, to thus ensure a more efficient tool management.

BRIEF DESCRIPTION OF THE DRAWINGS

FIG. 3 is an illustration showing an example of tool management data.

DESCRIPTION OF THE PREFERRED EMBODIMENT

An embodiment of the present invention is described with reference to the accompanying drawings.

Figure 2:
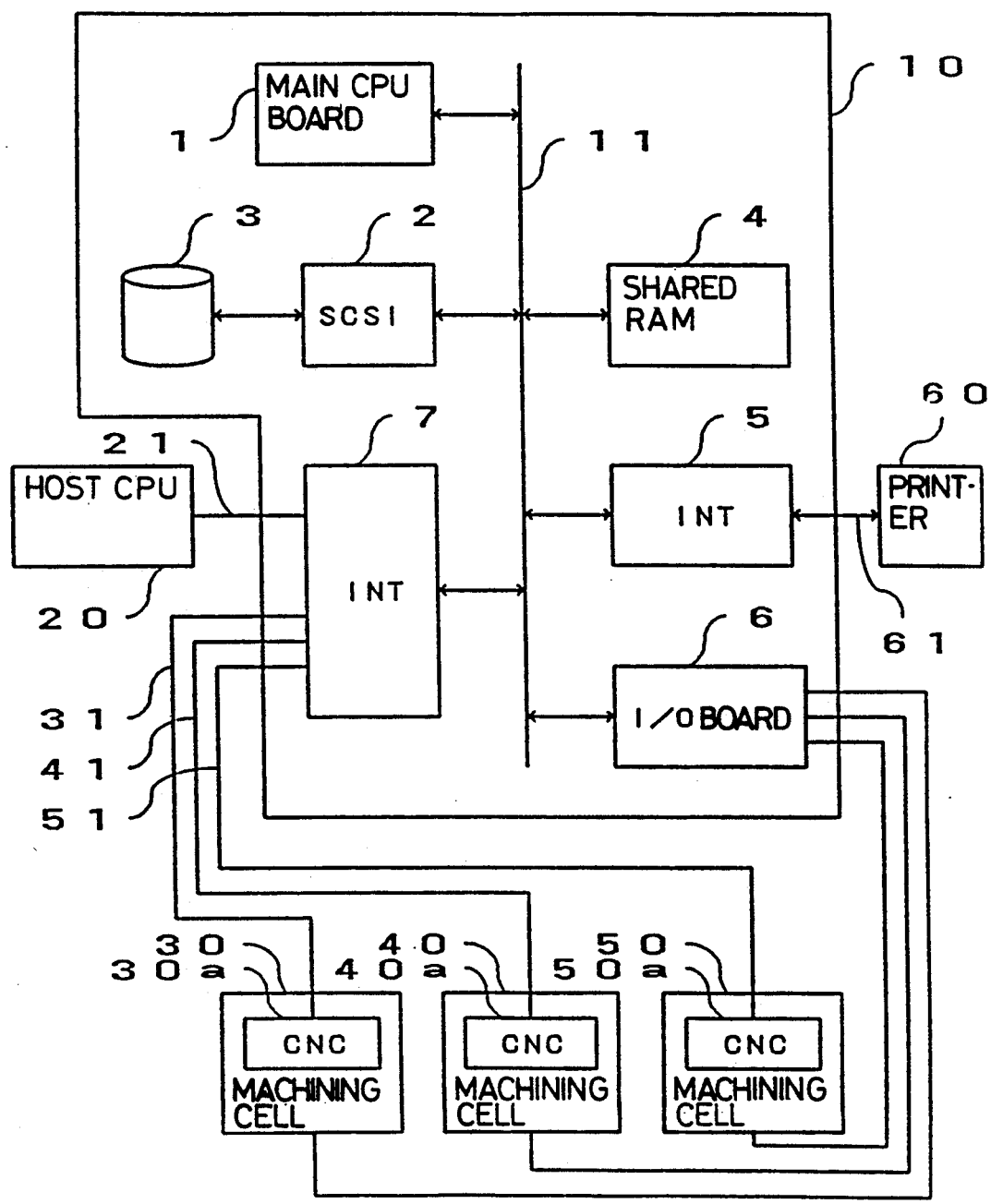
FIG. 2 is a block diagram of hardware of an FA system for implementing the present invention.

FIG. 2 is a block diagram of the hardware for implementing the present invention. In the drawing, a cell controller 10 receives a production management command, which includes tool management data, from a host CPU 20, and then sends a control signal, such as a machining command or the like, to machining cells 30, 40 and 50. The cell controller 10, in turn, receives machining information including tool management data such as a number of times a tool is used from the machining cells, and then sends the necessary machining information to the host CPU 20. The machining cells 30, 40 and 50 include computer numerically-controlled units (CNC) 30a, 40a and 50a.

The configuration of the cell controller 10 is centered around a CPU board 1. The main CPU board 1 consists of a processor, a ROM and a RAM and the like, mounted on a single board, and is connected to the following elements through a bus 11.

A hard disk 3 is connected to the bus 11 via an interface (SCSI) 2, and stores tool management data, machining schedules, machining programs and the like.

A shared RAM 4 consists of an SRAM, an interface 5 supplies output information such as a tool layout list to a printer 60 via an RS-232C communication line 61, an I/O board 6 transfers input/output signals to and from the machining cells 30, 40 and 50, and an interface 7 is connected to the host CPU 20 via a communication line 21, and to the computer numerically-controlled units 30a, 40a and 50a via communication lines 31, 41 and 51.

The communication lines 31, 41 and 51 are high-speed communication lines composed of 160-kbs telecommunication lines, and are arranged such that they provide bi-directional communication lines capable of transferring tool management data between the cell controller 10 and the machining cells 30, 40 and 50, in a real-time mode. These communication lines also may be arranged to provide even higher-speed communication lines, if optical communication lines are used therefore.

FIG. 3 shows an example of tool management data, wherein tool management data 70 is comprised of a tool number 71, area number 72 and data 73 for each tool. The remaining data consists of factors related to the service life of a tool, including a tool weight, tool correction amounts such as tool length correction amount, a set tool service value, tool operating time, a number of times a tool is used and the like.

Figure 1:
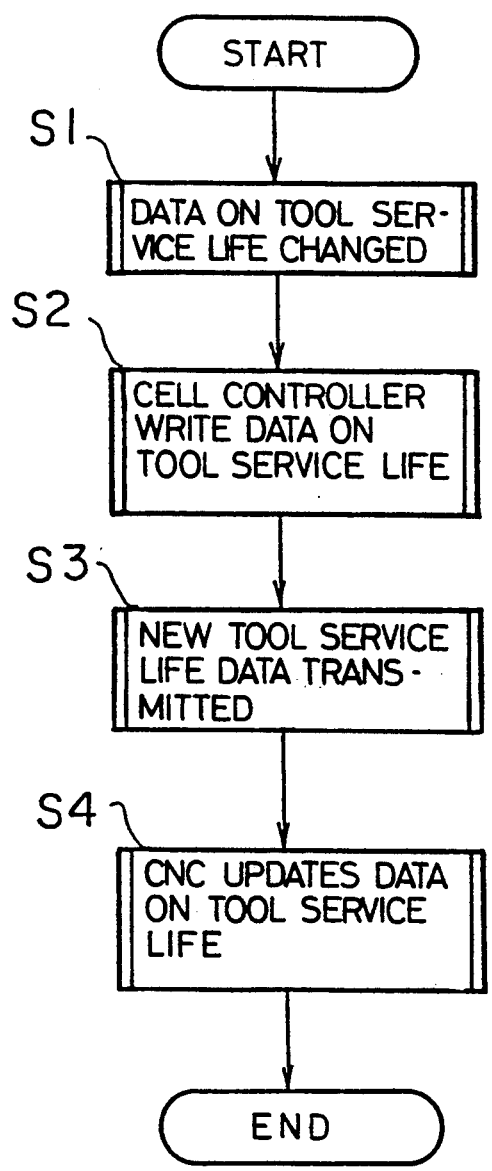
FIG. 1(a) is a flowchart showing the process of transferring tool life data from the cell controller to a machining cell.
FIG. 1(b) is a flowchart showing the process of sending data on the number of times a tool is used from a computer numerically-controlled unit (CNC) to the cell controller.
Figure 1:
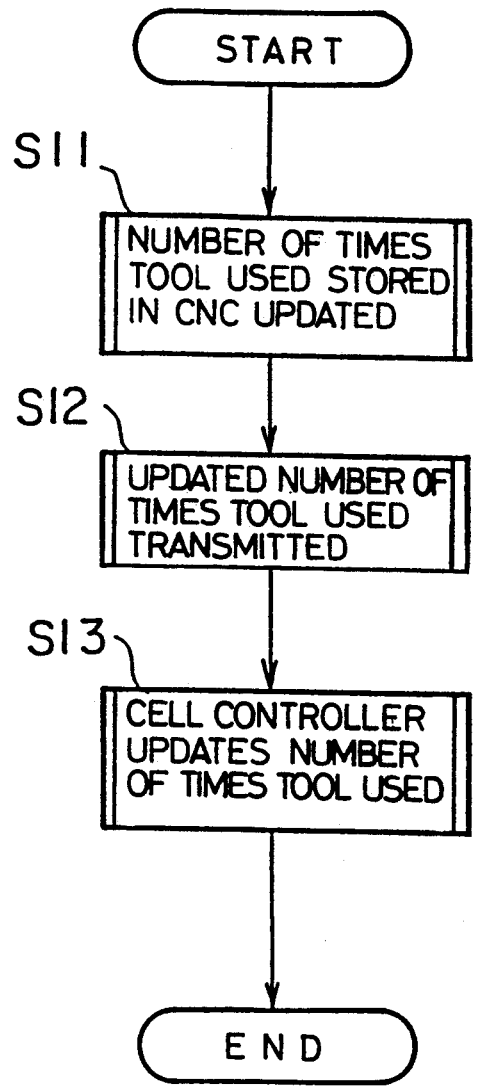

FIG. 1(a) is a flowchart of the process for sending tool service life data from the cell controller to a machining cell. In the drawing, the numbers following "S" indicate step numbers.

[S1] The tool service life data (set value of tool service life) is changed through the cell controller 10.

[S2] The tool service life data of the tool management data 70 is written to the hard disk 3 of the cell controller 10.

[S3] The tool service life data is sent to the computer numerically-controlled unit 30a via the communication line 31.

[S4] The tool service life data of the tool management data stored in the computer numerically-controlled unit 30a is changed to thereby carry out a tool management according to the updated tool service life data.

Accordingly, as soon as the tool service life data of the cell controller 30 is updated, the updated tool service life data is sent to the computer numerically-controlled unit 30a, to thus update the tool service life data of the computer numerically-controlled unit 30a. Therefore, the computer numerically-controlled unit 30a always has access to the latest tool service life data, to thereby ensure a more efficient management of the service life and the like of a tool.

FIG. 1(b) is a flowchart of a process for sending tool management data from a computer numerically-controlled unit (CNC) to the cell controller.

[S11] The data on how many times the tool has been used, which is stored in the CNC 30a, is updated each time the tool is used.

[S12] The updated data on the number of times the tool is used is sent to the cell controller 10 via the communication line 31.

[S13] The cell controller 10 updates the data on the number of times the tool is used of the tool management data 70 stored in the hard disk 3.

Accordingly, the cell controller 10 is always informed of the latest number of times that the tool has been used and thus the cell controller 10 is able to manage the service life of a tool by managing the number of times the tool is used, or by printing out a tool list or the like through a printer 60, to make arrangements to replace a tool having a service life which will expire shortly.

Namely, the cell controller and the computer numerically-controlled units can be connected via high-speed, bi-directional communications lines to implement a real-time transmission of tool management data, and thus both the cell controller and the computer numerically-controlled units are always aware of the most recent tool management data, to thereby achieve a more efficient tool management.

In the example described above, tool management data is transmitted between a cell controller and computer numerically-controlled units, but the host computer may be directly connected to a computer numerically-controlled unit or PC (programmable controller) in a machining cell, to thereby transmit tool management data between the host computer and the computer numerically-controlled unit or the PC.

As described above, according to the present invention, a host computer is connected to computer numerically-controlled units through high-speed, bi-directional communication lines, to permit a real-time transmission of tool management data, and thus achieve a more efficient tool management.

We claim:

1. A tool management method for a factory automation system consisting of a factory automation computer and machining cells, comprising the steps of:
    connecting said factory automation computer to computer numerically-controlled units in at least one of said machining cells via bi-directional communication lines transmitting data in parallel;
    exchanging tool management data between said factory automation computer and said computer numerically-controlled units, and when said tool management data in either thereof is changed, sending changed data to the other; and
    storing said tool management data in both said factory automation computer and said computer numerically-controlled units to thereby permit real-time management of said tool management data.

2. The tool management method according to claim 1, wherein said connecting of said factory automation computer connects a cell controller controlling one of said machining cells.

3. The tool management method according to claim 1, wherein said exchanging of said tool management data sent from said factory automation computer to said computer numerically-controlled units comprises at least exchanging service life data on tools used.

4. The tool management method according to claim 1, wherein said exchanging of said tool management data sent from said computer numerically-controlled units to said factory automation computer comprises at least a number of times a tool has been used.

* * * * *